Patented June 1, 1937

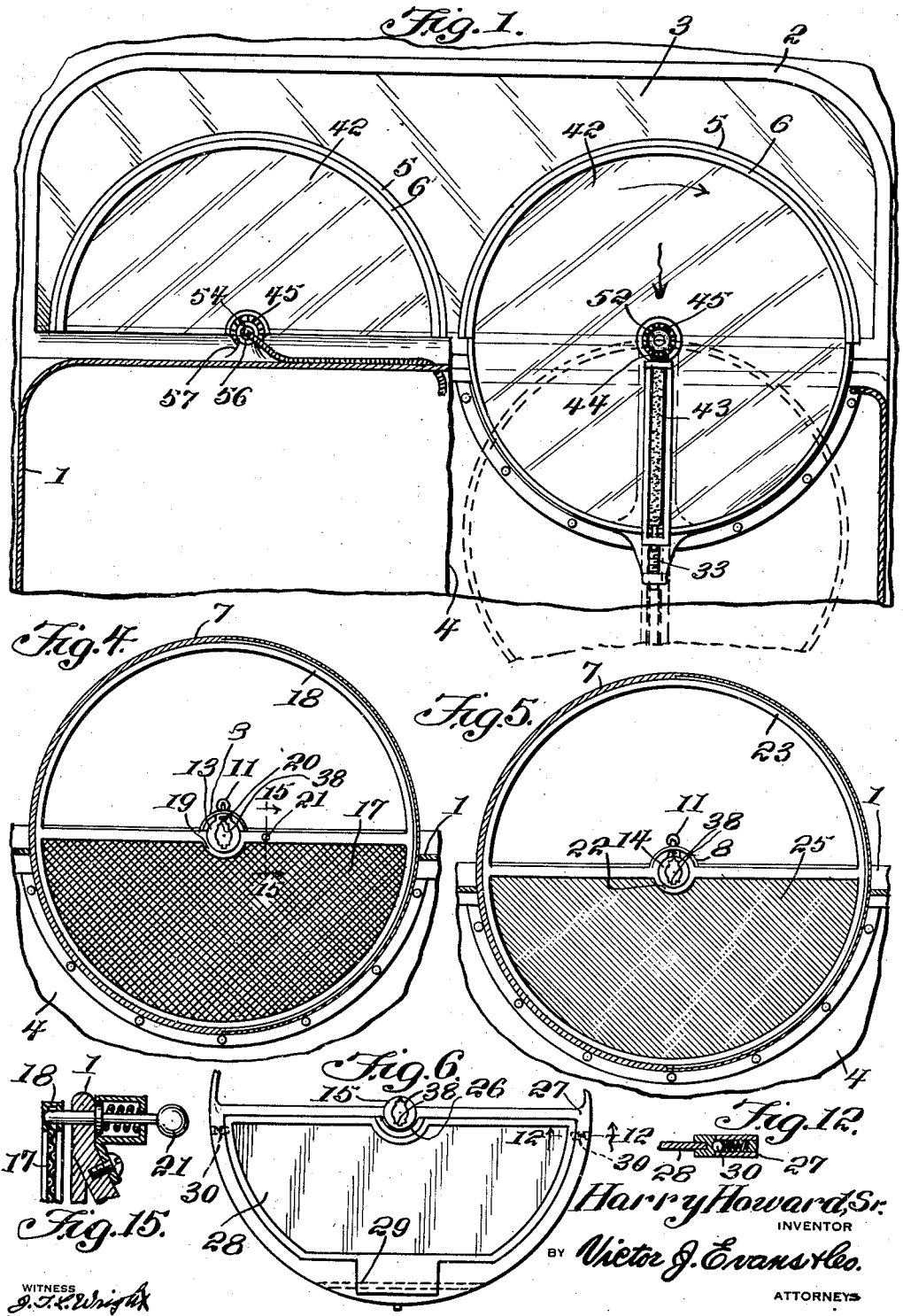

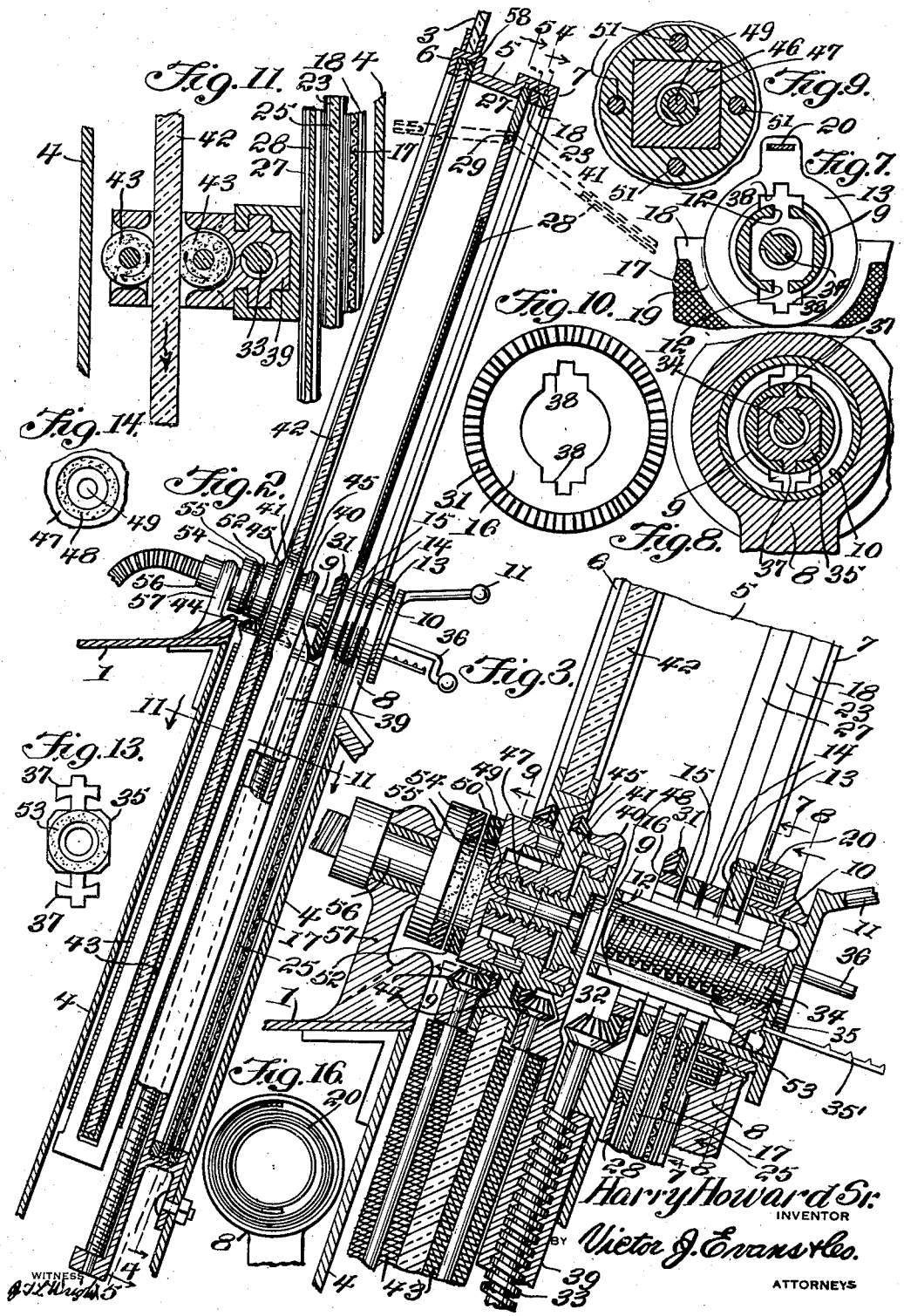

2,082,771

UNITED STATES PATENT OFFICE 2,082,771

WINDSHIELD

Harry Howard, Sr., Columbia, S. C.

Application July 31, 1936, Serial No. 93,691

9 Claims. (Cl. 296—84)

This invention relates to a clear vision device for windshields or windows of motor vehicles or other conveyances, and has for the primary object the provision of a device of this character which includes a rotatable transparent panel which when in an operative position will exclude weather elements from the interior of the vehicle and will provide clear vision by preventing the accumulation of rain, snow or sleet thereon and may be readily placed in inoperative position and when in the latter-named position will permit ventilation to the interior of the vehicle.

Another object of the invention is the provision of a screen, an awning or shade and a light diffusing panel either of which may be readily brought into operative position when said transparent panel occupies either of its positions.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary front elevation, partly in section, showing my invention associated with a windshield of a vehicle.

Figure 2 is a transverse sectional view illustrating my invention and its mounting to a vehicle.

Figure 3 is an enlarged fragmentary transverse sectional view showing the means of mounting and operating the panel, screen and awning or shade.

Figure 4 is a sectional view taken on the line 4—4 of Figure 2.

Figure 5 is a sectional view taken on the line 5—5 of Figure 2.

Figure 6 is a fragmentary plan view showing the shade or awning.

Figure 7 is a sectional view taken on the line 7—7 of Figure 3.

Figure 8 is a sectional view taken on the line 8—8 of Figure 3.

Figure 9 is a sectional view taken on the line 9—9 of Figure 3.

Figure 10 is a plan view illustrating a drive gear.

Figure 11 is a sectional view taken on the line 11—11 of Figure 2.

Figure 12 is a detail sectional view taken on the line 12—12 of Figure 6.

Figure 13 is a plan view illustrating a feed nut.

Figure 14 is a fragmentary end view illustrating one part of a clutch element.

Figure 15 is a detail sectional view taken on the line 15—15 of Figure 4.

Figure 16 is a fragmentary sectional view showing a spring for moving the screen into operative position when released by the catch shown in Figure 15.

While I am showing and describing in detail in this application my invention adapted to a windshield of a motor vehicle, it is to be understood that this invention can be utilized in connection with windows of a vehicle and for other purposes whenever it is desired to give clear vision and to exclude weather elements and to provide for ventilation.

Referring in detail to the drawings, the numeral 1 indicates a fragmentary portion of a motor vehicle body and 2 a windshield, the glass panel thereof being indicated by the character 3 and as shown in Figure 1 a pair of devices constructed in accordance with my invention is associated with the panel 3, the latter being cut away to receive such devices. However, these devices are duplicate in construction and operation and reference specifically to one is thought sufficient.

The motor vehicle body 1 below the windshield 2 has constructed therein a housing 4 forming closure and concealment for my invention when in-operative and the panel 3 directly above the housing 4 is cut away and receives therein a frame 5 of semicircular shape. The frame 5 is offset to form guides 6 and 7.

A mounting 8 is located adjacent the mouth of the housing 4 and forms a journal for integrally connected inner and outer sleeves 9 and 10, the outer sleeve 10 being provided with a handle 11 whereby the sleeves may be rotated. The inner sleeve 9 has oppositely arranged slots 12 and also forms a journal for hubs 13, 14, 15 and 16. Mounted on and secured to the hub 13 is a screen 17 of semicircular shape. The screen 17 is mounted in a circular-shaped frame 18, the screen 17 closing approximately one-half of the frame 18. The screen 17 or the hub of the annular frame 18, which is indicated by the character 19, is secured to the hub 13 so that the screen frame 18 may be rotated to position the screen either within the housing 4 or within the frame 5. The mounting 8 also forms a housing for a spring 20 of the clock type wherein one end is anchored to the mounting 8 and the other end secured to the hub 19 of the screen frame 18. The spring 20 acts to rotate the screen frame 18 in a direction to position the screen to close the frame 5. The screen frame is rotated manually in a reverse direction to position the screen in the housing and which will be hereinafter more fully described in detail. A spring pressed latch pin 21 is adapted to enter a keeper in the screen frame 18 for releasably securing the screen within the housing 4 so that when it is desired to close the frame 5 by the screen the spring pressed latch pin 21 is disengaged from the keeper, permitting the spring 20 to propel or rotate the screen frame 18 for positioning the screen to close the frame 5, the spring being wound when the screen frame is rotated manually in an opposite direction for positioning of the screen within the housing.

The hub 14 has secured thereto a hub 22 of a frame 23 of annular formation. The frame 23 is partly closed by a light diffusing panel 25 similarly shaped to the screen 17. The frame 23 may be rotated to position the panel 25 either within the housing 4 or in a position to close the frame 5. The means for rotating the frame 23 through the hub 14 will be hereinafter more fully described.

The hub 15 has a hub 26 of a frame 27 secured thereto and the frame 27 has hinged thereto an awning or shade 28 shaped similar to the panel 25 and the screen 17. The hinge connection of the awning or shade 28 to the frame 27 is indicated by the character 29 and said awning or shade 28 may be swung angularly to the frame 27 in opposite directions when released by a spring catch 30. The angular positions of the awning or shade are indicated by dotted lines in Figure 2. The frame 27 may be rotated through the hub 15 to position the awning 28 within the frame 5 or within the housing 4.

The hub 16 has secured thereon or forms an integral part of a gear 31 which meshes with a pinion 32 of a feed shaft 33. The feed shaft 33 is employed for raising and lowering another part of my invention and which will be hereinafter more fully described.

The outer sleeve 10 has journaled thereon a feed stem 34 which extends into the inner sleeve 9 and has threaded thereon a feed nut 35. The feed stem 34 has a crank handle 36 whereby the feed stem 34 may be manually rotated. The feed nut 35 has formed thereon oppositely disposed projections 37 and the hubs 13 to 16, inclusive, have recesses 38 to receive the projections 37 as the feed nut is caused to move endwise of the feed stem 34. The projections 37 extend through the slots 12 of the inner sleeve preventing the feed nut from rotating with the feed stem by positioning the projections 37 within the recesses 38 of the hub 13 and rotating the handle 11 of the outer sleeve 10 the screen may be lowered from the frame 5 into the housing 4. A reverse rotation of the handle 11 will position the screen outwardly of the housing 4 and into the frame 5. However, this is not necessary as the spring 30 will act to so position the screen when the latter is released by actuating the spring latch 21 but it is necessary to manually rotate the hub 13 through the feed nut, feed stem and outer sleeve 10 to position the screen within the housing. By rotating the feed stem 34 until the projections move into the recesses 38 of the hub 14, the diffusing panel may be positioned either within the frame 5 or housing 4 depending in which direction the handle 11 is rotated. The positioning of the projections 37 of the feed nut in the recesses 38 of the hub 15 by the rotation of the feed stem 34 will secure the hub 15 to the outer sleeve 10 and when rotated by the handle 11 in either direction the shade or awning will be positioned either within the housing 4 or within the frame 5. The positioning of the projections 37 of the feed nut in the recesses 38 of the gear 31 will permit manual rotation of the gear in either direction by the rotation of the handle 11.

A feed nut 39 is mounted or threaded on the feed stem 33 and has an extension 40 which acts as a mounting or journal for a hub 41 which may be moved by the rotation of the feed stem 33 into and out of alignment with the hubs 13 to 16, inclusive, or may be positioned within the housing 4. The hub 41 supports a circular-shaped transparent panel 42 preferably constructed of shatter-proof glass. It is to be understood that the feed stem 33 may be rotated in either direction by the handle 11, this being accomplished by positioning the projections 37 of the feed nut 35 in the recesses 38 of the hub 16 to which the gear 31 is secured, the gear 31 being in mesh with the pinion 32 secured to the feed stem 33. Therefore, by rotating the handle 11 in one direction the panel 42 may be positioned to close the frame 5 and be free to rotate relative thereto and by rotating the handle 11 in an opposite direction, the panel 42 may be moved downwardly in the housing 4 to open the frame 5. Through means which will be hereinafter more fully described the panel 42 is rotated when occupying a position within the frame 5. The panel rotating will have a tendency to prevent the accumulation of rain, snow or sleet and foreign matter thereon and to aid in keeping the panel clean wipers 43 located within the housing 4 contact opposite faces of the panel 42. The wipers are in the form of rollers rotatably supported by the mounting 40 and have secured thereto gears 44 meshing with gears 45 secured to the hub of the panel 42. Thus the rotation of the panel 42 will impart rotation to the wipers or rollers 43, however, the wipers or rollers 43 will rotate at a faster rate of speed than the panel 42 due to the size of the gears 44 and 45. The hub 41 has a substantially rectangular-shaped bore, as shown in Figure 9, and receives a correspondingly shaped feed nut 46. The feed nut 46 meshes with feed threads of a feed stem 47. The feed stem 47 is rotatably supported in the hub 41 and one end thereof is socketed to form a clutch facing 48. The other end of the feed stem 47 is open to receive a pin 49 formed on a clutch plate 50. A series of guide pins 51 is formed on the clutch plate 50 and are slidably received in sockets formed in the hub 41. The clutch plate 50 has a clutch facing 52. The feed stem 47 is rotated by moving the feed nut 35 into engagement with the clutch facing 48 and rotating the handle 11. The feed nut 35 has a clutch facing 53 to engage the clutch facing 48 of the feed stem. To adjust the feed nut 35 in engagement with the feed stem 47 the handle 36 is rotated while the handle 11 is held stationary. A clutch plate 54 provided with a clutch facing 55 is engaged by the clutch plate 50 when the latter is moved endwise by the rotation of the handle 11. The clutch plate 54 is secured to a power shaft 56 journaled in a suitable mounting 57. The power shaft 56 may be controlled and driven in any well known manner.

When it is desired to rotate the panel 42 and when positioned to close the frame 5, the clutch plate 50 is moved into engagement with the clutch plate 54. The power is then applied to the power shaft 56, consequently rotating the panel 42 and the rotation of the latter rotates the wipers. The wipers contacting with the panel 42 during the rotation thereof will maintain said panel free of foreign matter such as rain, sleet or snow.

The panel 42 has a marginal rim 58 and this rim is received in the guide 6 of the frame 5 when the panel 42 is positioned to close the frame 5. The frames of the screen, diffusing panel and awning or shade are received in the guide 7 of the frame 5 when these parts are positioned in the frame 5 and out of the housing 4.

The feed nut 39 is mounted, as shown in Figure 11, so as to have free sliding movement but which will be held against rotation with the feed stem 33.

Secured to the feed nut 35 and extending through an opening in the end of the sleeve 10 is an indicator 35'. This indicator is adapted to move with the nut 35 for the purpose of showing to the operator the exact location of the nut within the sleeve 10. By having the indicator 35', the operator may judge when the nut is properly positioned to engage with a selected hub for the purpose of bringing about the actuation of the element carried by the respective hub.

It is to be understood that when the shatter-proof panel 42 is rotating the speed of rotation is such that it will not affect vision through the panel. Further, it is to be understood that this panel may be in frame-closing position and allowed to remain stationary. Also, it is to be understood that the screen when in frame-closing position will protect the occupants of the vehicle from shattered glass should the panel be broken. Besides, the screen will prevent the entrance of insects and foreign matter to the interior of the vehicle.

Having described the invention, I claim:

1. In combination with a transparent panel of a window or windshield having a cutout portion, a frame mounted in the cutout portion of the panel, a housing located adjacent the frame and having a mouth, a mounting located at the mouth of the housing, a transparent panel rotatably supported by said mounting and capable of being bodily moved into and out of the frame and into and out of the housing, and means for rotating the panel.

2. In combination with a panel of a windshield or window and having a cutout portion, a frame set in said cutout portion of the panel, a housing located below the frame and having a mouth arranged adjacent the frame, a mounting located at the mouth of the housing, shade, diffusing panel and screen frames rotatably supported by said mounting, a shade, diffusing panel and screen supported by said shade, diffusing panel and screen frames and each closing approximately one-half of their respective frames, and means by which either of said shade, diffusing panel and screen frames may be rotated to position the shade, diffusing panel or screen to close the first-named frame or to be positioned within the housing.

3. In combination with a panel of a windshield or window and having a cutout portion, a frame set in said cutout portion of the panel, a housing located below the frame and having a mouth arranged adjacent the frame, a mounting located at the mouth of the housing, shade, diffusing panel and screen frames rotatably supported by said mounting, a shade, diffusing panel and screen supported by said shade, diffusing panel and screen frames and each closing approximately one-half of their respective frames, means by which either of said shade, diffusing panel and screen frames may be rotated to position the shade, diffusing panel or screen to close the first-named frame or to be positioned within the housing, said shade being hinged to its respective frame whereby the shade may be swung at an angle thereto when its frame is positioned within the first-named frame.

4. In combination with a panel of a windshield or window and having a cutout portion, a frame set in said cutout portion of the panel, a housing located below the frame and having a mouth arranged adjacent the frame, a mounting located at the mouth of the housing, shade, diffusing panel and screen frames rotatably supported by said mounting, shade, diffusing panel and screen supported by said shade, diffusing panel and screen frames and each closing approximately one-half of their respective frame, means by which either of said diffusing panel, shade and screen frames may be rotated to position the shade, diffusing panel or screen to close the first-named frame or to be positioned within the housing, said shade being hinged to its respective frame whereby the shade may be swung at an angle thereto when its frame is positioned within the first-named frame, and a latch means for securing the shade within a plane of its respective frame.

5. In combination with a panel of a windshield or window and having a cutout portion, a frame set in said cutout portion of the panel, a housing located below the frame and having a mouth arranged adjacent the frame, a mounting located at the mouth of the housing, shade, diffusing panel and screen frames rotatably supported by said mounting, shade diffusing panel and screen supported by said shade, diffusing panel and screen frames and each closing approximately one-half of their respective frames, means by which either of said shade, diffusing panel and screen frames may be rotated to position the shade, diffusing panel or screen to close the first-named frame or to be positioned within the housing, said shade being hinged to its respective frame whereby the shade may be swung at an angle thereto when its frame is positioned within the first-named frame, a latch means for securing the shade within a plane of its respective frame, spring means for rotating the screen frame to position the screen within the main frame when the screen frame is released from a position within the housing, and means for releasably securing the screen frame in the housing.

6. In combination with a transparent panel of a windshield or window having a cutout portion, a main frame set in said cutout portion, a housing having a mouth located adjacent the frame, a mounting located adjacent the mouth of the housing, integrally connected inner and outer sleeves journaled in said mounting, means for rotating said sleeves, hubs journaled on the outer sleeve and having recesses, a shade, a diffusing panel and a screen mounted on said hubs, and may be positioned to lie within the housing or to close the frame by rotation of the hubs, and means carried by the sleeves to selectively rotate the hubs by engaging the recesses thereof.

7. In combination with a transparent panel of a windshield or window having a cutout portion, a main frame set in said cutout portion, a housing having a mouth located adjacent the frame, a mounting located adjacent the mouth of the housing, integrally connected inner and outer sleeves journaled in said mounting, means for rotating said sleeves, hubs journaled on the outer sleeve and having recesses, a shade, a diffusing panel and a screen mounted on said hubs and may be positioned to lie within the housing or to close the frame by rotation of the hubs, a feed stem journaled in the inner sleeve, means for rotating the feed stem, said inner sleeve having slots, a feed nut meshing with the feed stem, projections on the feed nut and extending through the slots to move into the recesses of any one of the hubs whereby any one of the hubs may be rotated by the rotation of the sleeves.

8. In combination with a transparent panel of a windshield or window having a cutout portion, a main frame set in said cutout portion, a housing having a mouth located adjacent the frame, a mounting located adjacent the mouth of the housing, integrally connected inner and outer sleeves journaled in said mounting, means for rotating said sleeves, hubs journaled on the outer sleeve and having recesses, a shade, a diffusing panel and a screen mounted on said hubs and may be positioned to lie within the housing or to close the frame by rotation of the hubs, a feed stem journaled in the inner sleeve, means for rotating the feed stem, said inner sleeve having slots, a feed nut meshing with the feed stem, projections on the feed nut and extending through the slots to move into the recesses of any one of the hubs whereby any one of the hubs may be rotated by the rotation of the sleeves, a second feed stem rotatably supported by said mounting, a hub journaled on said mounting, and having recesses to receive the projections of the feed nut whereby said last-named hub may be rotated by the rotation of the sleeves, driving means between the last-named hub and the second-named feed stem, a feed nut mounted on the second-named feed stem, a second mounting carried by the second-named feed nut and providing a journal adapted to be raised and lowered into and out of said housing and when out of said housing to align with the hubs, a transparent panel rotatably supported by said journal and may be positioned to close the frame or to open the latter by the movement of the journal out of and into the housing, means for rotating the panel and including a clutch element, and a second clutch element actuated in engagement with the first-named clutch element by the first-named feed nut whereby the transparent panel may be rotated by said driving means.

9. In combination with a transparent panel of a windshield or window having a cutout portion, a main frame set in said cutout portion, a housing having a mouth located adjacent the frame, a mounting located adjacent the mouth of the housing, integrally connected inner and outer sleeves journaled in said mounting, means for rotating said sleeves, hubs journaled on the outer sleeve and having recesses, a shade, a diffusing panel and a screen mounted on said hubs and may be positioned to lie within the housing or to close the frame by rotation of the hubs, a feed stem journaled in the inner sleeve, means for rotating the feed stem, said inner sleeve having slots, a feed nut meshing with the feed stem, projections on the feed nut and extending through the slots to move into the recesses of any one of the hubs whereby any one of the hubs may be rotated by the rotation of the sleeves, a second feed stem rotatably supported by said mounting, a hub journaled on said mounting and having recesses to receive the projections of the feed nut whereby said last-named hub may be rotated by the rotation of the sleeves, driving means between the last-named hub and the second-named feed stem, a feed nut mounted on the second-named feed stem, a second mounting carried by the second-named feed nut and providing a journal adapted to be raised and lowered into and out of said housing and when out of said housing to align with the hubs, a transparent panel rotatably supported by said journal and may be positioned to close the frame or to open the latter by the movement of the journal out of and into the housing, means for rotating the panel and including a clutch element, a second clutch element actuated in engagement with the first-named clutch element by the first-named feed nut whereby the transparent panel may be rotated by said driving means, rotatable wipers contacting the transparent panel, and means for rotating said wipers by the rotation of the transparent panel.

HARRY HOWARD, Sr.